Patented July 21, 1942

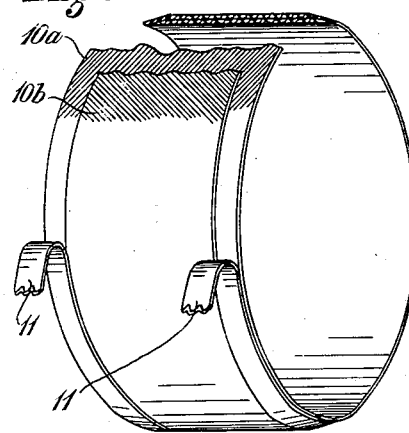
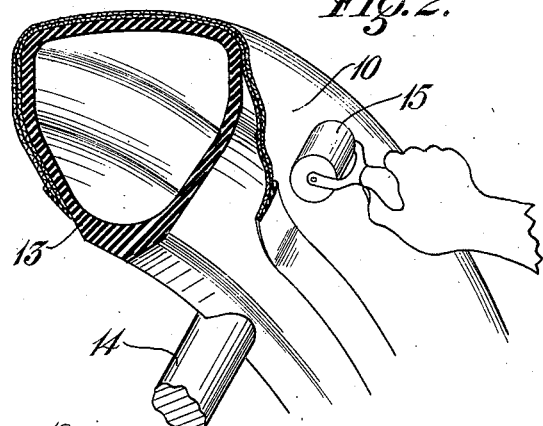
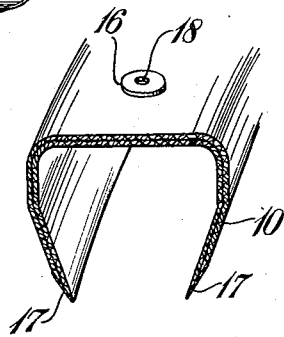
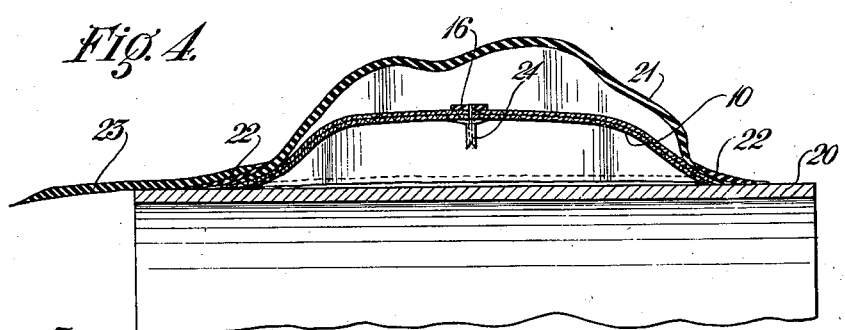
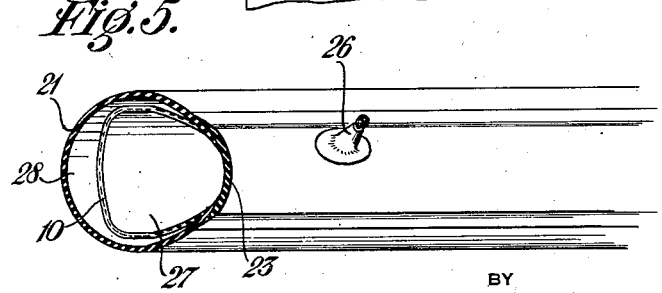

2,290,617

UNITED STATES PATENT OFFICE 2,290,617

METHOD OF MAKING INNER TUBES

Howard C. Ickes, Akron, Ohio, assignor to The Firestone Tire & Rubber Company, Akron, Ohio, a corporation of Ohio Application June 3, 1939, Serial No. 277,204

5 Claims. (Cl. 154—14)

This invention relates to methods of making inner tubes for pneumatic tires, and more especially it relates to improved procedure for the manufacture of safety inner tubes of the type wherein the interior of the tube has a circumferentially arranged diaphragm of impervious, inextensible material that divides the tube into concentric inner and outer compartments or chambers.

The chief objects of the invention are to provide an improved method for the facile and economical production of safety inner tubes of the character mentioned; and to produce tubes of superior quality. Other objects will be manifest as the specification proceeds.

Of the accompanying drawing:

Figure 1 is a perspective view showing the initial construction of the annular, two ply, rubberized fabric band that constitutes the diaphragm of the finished inner tube;

Figure 2 is a fragmentary sectional perspective view showing how the fabric band is shaped about an annular expansible core;

Figure 3 is a sectional perspective view of the fabric band after it has been vulcanized upon the expansible core and subsequently removed therefrom;

Figure 4 is a fragmentary sectional view showing the steps of applying an unvulcanized, annular rubber structure to the outside of the fabric band, and the application of a strip of unvulcanized rubber to one margin thereof; and Figure 5 is a sectional view of the completely assembled inner tube prior to the vulcanization thereof.

Referring to the drawing, 10 designates generally a rubberized fabric structure that eventually constitutes the circumferential diaphragm of the improved inner tube. Said structure consists of a two-ply endless band that conveniently may be made on a collapsible form or drum, the plies thereof being designated 10a and 10b respectively. The fabric of said plies is bias-cut, weftless or weak-wefted cord fabric such as is used in the manufacture of tire casings, said fabric being rubber coated on both sides, the plies being so laid that the cords of one ply are arranged transversely with relation to the cords of the other ply. The inner ply 10a of the structure is wider than the ply 10b, the latter being symmetrically positioned on ply 10a to provide stepped margins of uniform width at each side of the band, and thin strips 11 of unvulcanized rubber are overlaid upon the respective stepped margins.

The band 10, constructed as described, is removed from the drum on which it is formed, and then is stretched over an annular expansible core 13 which may be of substantially the shape with flat periphery shown in Figure 2. However, other shapes having a convex or concave periphery (not shown) may be employed. Said core may be made of rubber, and provided with an inflation stem (not shown) by which it may be distended by the admission of fluid pressure to the interior thereof. The core 13 is mounted for rotary movement about its axis upon a suitable chuck of which 14 is one of the core-engaging arms thereof. After the band 10 is centrally positioned upon the core 13, the latter is rotated about its axis, and the marginal portions of the band are "stitched" down onto the sides thereof, a hand-roller 15 usually being employed for this purpose. After the band is fully rolled down, an apertured fabric disc or washer 16 is adhered to periphery thereof at its centerline. Thereafter the core 13, with band 10 thereon, is dismounted from its chuck and placed in a vulcanizing mold (not shown) wherein the band is subjected to heat, and to pressure induced by fluid that is forced into the expansible core. After the band is partly vulcanized to the desired extent, the expansible core is removed from the vulcanizer, and the band is stripped therefrom. Thereafter the marginal portions of the band are buffed, on the outer faces thereof, substantially to a feather edge, the buffed regions being substantially two inches in width. The buffed regions are then treated with a suitable adhesive, after which respective thin strips of "tie gum" 17 are adhered thereto, the band then being of crescent shape in transverse section as shown in Figure 3. At this time, an aperture 18 may be formed in the band 10 within the disc 16 thereon.

The band 10 is then mounted upon a rotatable drum, a portion of which is shown at 20, Figure 4. The drum 20 is of larger outside diameter than the smallest diameter of the band, but is smaller than the outside diameter of the band. The band is mounted thereon by spreading apart the lateral marginal portions of the band and stretching them sufficiently to pass onto the drum, the larger, intermediate portion of the band arranging itself in a wave-like succession of bulges and depressions circumferentially of the drum. Next, an endless band 21 of unvulcanized rubber composition is provided, which band may be somewhat larger in diameter and of greater width than the fabric band 10, the lateral margins of the band 21 being exteriorly beveled. The band 21 is drawn edgewise over the fabric band 10 on the drum, and its leading edge is attached to the underlying marginal portion of the band 10 on the drum, about one inch short of the edge thereof. Thereafter the other marginal portion of the band 21 is pulled over the other marginal portion of band 10 and similarly attached thereto, as shown in Figure 4. Then strips of "tie gum" 22 are applied to the overlapped margins of the two bands

10, 21. Lastly a strip of unvulcanized rubber 23 is applied to the fabricated structure on the drum, one marginal portion of said strip overlying one marginal portion of said structure, the other marginal portion of the strip being free. The strip 23 may be of substantially the same thickness or gauge as the rubber of band 21, or slightly thicker, and it is of considerably narrower width and shorter length. Both lateral margins of the strip 23 are beveled, the bevels being disposed upwardly as the strip is applied. The structure, complete to the extent shown in Figure 4, is now removed from the drum 20. A suitable rubber valve, such as a flutter valve 24, may be mounted on the inner face of the fabric band 10 either before it is mounted on the drum 20, or after its removal therefrom.

After the said structure is removed from the drum 20, the band 10 tends to return to its normal, transversely arcuate or crescent shape. It is placed in horizontal position on any suitable support, with the unattached margin of the strip 23 disposed upwardly. The strip 23 is then perforated, preferably at a point diametrically opposite the flutter valve 24, and an inflation valve stem 26 is adhered to the strip, over said perforation, on that face of the strip that is outermost in the finished structure. The unattached margin of the strip 23 is then attached to the free margin of the structure consisting of bands 10, 12, the assembled structure then presenting the appearance shown in Figure 5.

The final step of making the tube consists in vulcanizing the structure shown in Figure 5. Vulcanization is effected in any suitable mold. During vulcanization, heated gaseous fluid under pressure is admitted to the tube through valve stem 26, which fluid passes freely through flutter valve 24 whereby pressures on opposite sides of the unattached portion of band 10 are equalized, said pressure serving to force the rubber walls of the tube structure against the mold walls. The unattached portion of the band 10 constitutes the circumferential partition or diaphragm that divides the finished inner tube into concentric inner and outer compartments or chambers, the latter being designated 27 and the former 28.

By the method set forth the inner tube is economically produced, and adequate bonding of the respective elements thereof is effected.

Modification may be resorted to without departing from the spirit of the invention, or the scope thereof as defined by the appended claims.

What is claimed is:

1. The method of making safety inner tubes consisting of concentric inner and outer circumferential chambers which comprises forming an annular plural-ply band of rubberized fabric, shaping said band substantially to crescent shape in transverse section with the margins of said band at the inner circumference thereof, distending said band and partly vulcanizing the same while supporting it on the side thereof to which distending pressure is applied, covering the outside of said band with a circumscribing band of unvulcanized rubber of greater diameter and attaching the margins of the rubber structure to the margins of the fabric structure, to form the outer chamber of the tube, joining the margins of the composite structure by an interposed strip of unvulcanized rubber, to form the inner chamber of the tube, and then vulcanizing the resulting structure.

2. The method of making safety inner tubes consisting of inner and outer concentric chambers which comprises forming an endless plural-ply band of rubberized fabric having stepped margins, mounting the band upon a form and shaping it substantially to crescent shape in transverse section with the concave side innermost, partly vulcanizing the band and distending the same while it is supported on said form, removing the band from the form, buffing the margins of the band on the convex side thereof, covering the outside of the band with a circumscribing band of unvulcanized rubber of greater diameter and width and joining said bands at the respective margins thereof, to form the outer chamber of the tube, attaching the margins of a strip of unvulcanized rubber to the respective margins of the fabricated band, to form the inner chamber of the tube on the concave side of the latter, and then subjecting the structure to heat and internal pressure to vulcanize the same.

3. The method of making safety inner tubes comprising concentric radially inner and outer circumferential chambers separated by a diaphragm, which comprises the steps of uniting the marginal portions of a partly vulcanized and distended circumferential diaphragm element with the marginal portions of a circumferential outer unvulcanized rubber band element of greater transverse width, to form the radially outer chamber, and then uniting the marginal portions of the diaphragm by uniting the margins of a strip of rubber circumferentially to the respective marginal portions of one of the aforesaid elements to complete the radially inner chamber.

4. The method of making safety inner tubes which comprises forming an annular plural-ply band of rubberized fabric, shaping said band substantially to crescent shape in transverse section and partly vulcanizing the same with the margins of said band at the inner circumference thereof, covering the convex side of said band with a circumscribing band of unvulcanized rubber of greater diameter and attaching the margins of the rubber structure to the margins of the fabric structure, to form the outer chamber of the tube, mounting a valve in the fabric structure on the concave side thereof, joining the margins of the composite structure by means of an interposed strip of unvulcanized rubber, and then vulcanizing the resulting structure.

5. The method of making safety inner tubes comprising concentric radially inner and outer circumferential chambers separated by a diaphragm which comprises the steps of uniting the marginal portions of a partly vulcanized circumferential diaphragm element with the marginal portions of a circumferential outer unvulcanized rubber band element of greater transverse width to form the radially outer chamber, providing a valved opening to said chamber through said diaphragm element, uniting the marginal portions of the diaphragm by attaching the margins of a strip of unvulcanized rubber circumferentially to the respective marginal portions of one of the aforesaid elements to complete the radially inner chamber, and then vulcanizing the resulting structure.

HOWARD C. ICKES